Nov. 30, 1971　　　R. B. WITHROW　　　3,623,364
PROBE FOR INDICATING THE FLOW OF FLUID
Filed Dec. 16, 1968　　　2 Sheets-Sheet 1

INVENTOR.
ROBERT B. WITHROW
BY
Warren H. F. Schmieding
ATTORNEY

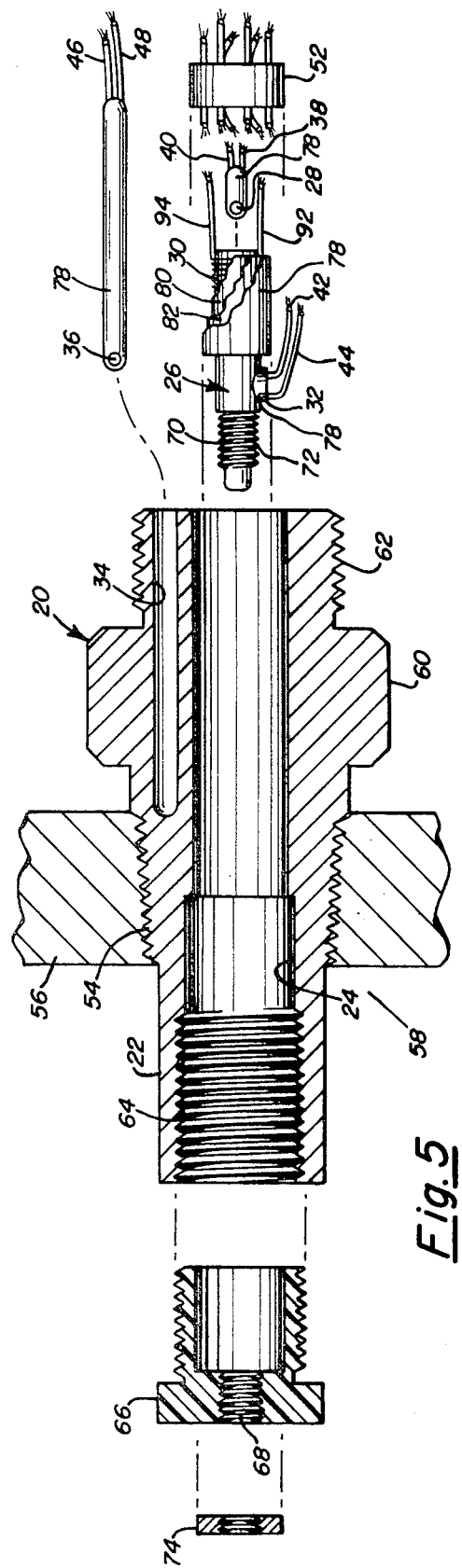
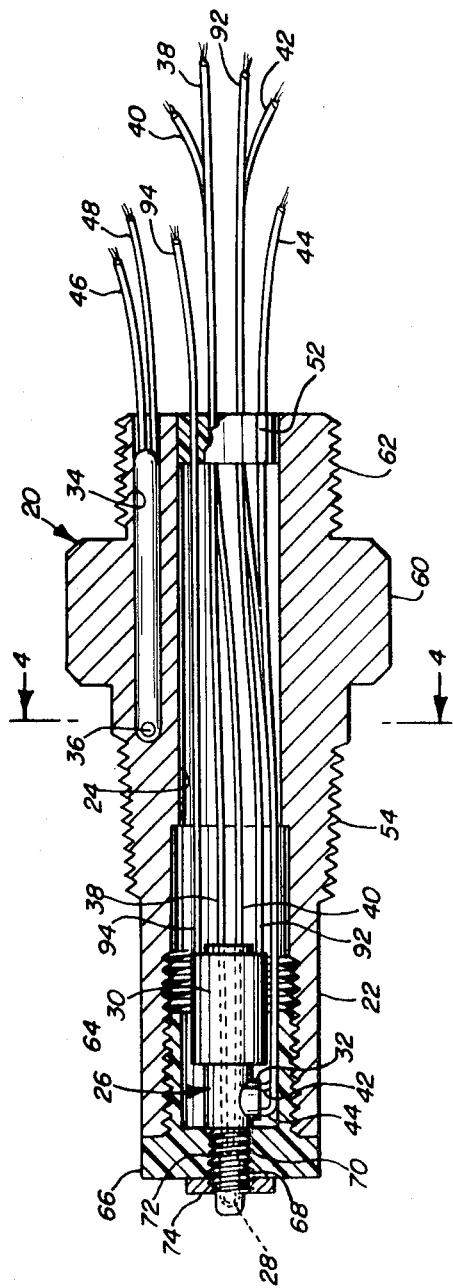

United States Patent Office 3,623,364
Patented Nov. 30, 1971

3,623,364
PROBE FOR INDICATING THE FLOW OF FLUID
Robert B. Withrow, 3864 Bayside Walk,
San Diego, Calif. 92108
Continuation-in-part of application Ser. No. 485,155,
Sept. 7, 1965. This application Dec. 16, 1968,
Ser. No. 783,956
Int. Cl. G01p 5/10
U.S. Cl. 73—204         17 Claims

ABSTRACT OF THE DISCLOSURE

The probe, in one embodiment, comprises a sensor whose resistance varies with the variations in temperature, an electric heater in heat exchange relationship with the sensor, and a casing that isolates the sensor and heater from direct contact with the fluid being probed. In another embodiment, the probe, in addition to the first mentioned sensor, includes an ambient reference sensor and a heater feedback signal sensor, the three sensors being in heat exchange relationship.

CROSS-REFERENCE TO RELATED APPLICATION

The present application is a continuation-in-part of my co-pending application Ser. No. 485,155, filed Sept. 7, 1965, now abandoned.

BACKGROUND OF THE INVENTION

(1) Field of the invention

The invention is directed to a probe for measuring the flow of fluid, the probe being of the type having a sensor which is in heat exchange relationship with the fluid and of the type which varies in resistance with variations in temperature. The probe also includes an electric heater which tends to maintain the sensor at a constant temperature.

(2) Description of the prior art

The patents to Rogoff No. 2,926,299 and Guidi No. 3,363,466 show probes having sensors, but they do not include a heater.

Each of the patents to Shockley No. 2,509,889, Calhoun No. 3,142,170 and Scarpa No. 3,335,606 employs at least one thermistor and a heater in heat exchange relationship with the thermistor. In each patent, both the thermistor and the heater are in direct contact with the fluid, and since practically all fluids are electrical conductors, when sufficient current is applied to the heater to heat the thermistor, electric current will flow between those elements, resulting in a short circuit.

Therefore, the problem involved in the prior art was not solved by the aforementioned patents.

The systems of the prior art have extremely limited range due to the inherent small physical size of the sensing element and the limited amount of electrical power that can be applied to the heater. A high damage rate is inevitable when the normal commercial thermistor is placed in a high pressure fluid system. Self-destruction, due to overheating, occurs when the thermistor is rapidly changed from one conductive medium to another such as moving the probe from water to air.

Accordingly, the present invention is directed to a fluid sensing probe suitable for use in a pressure fluid system without sustaining damage due to high pressure in the system. The design is such that it permits a constant, controlled heat of any required power to be applied to the sensor tube. The probe can be moved from one conductive medium, such as water, to another medium, such as air, without damage to the sensor. Also, with an internal ambient temperature reference sensor, the probe is usable over a wide range of fluid temperatures.

SUMMARY OF THE INVENTION

In practicing the present invention wherein the probe employs a semi-conductor type sensor, such as diodes, transistors, thermistors, etc., and electric heaters in heat exchange relationship with the semi-conductors, the probe includes a casing which houses the semi-conductor and heater, the semi-conductor being in intimate heat exchange relationship with the fluid, but isolated from direct contact with the fluid.

In one embodiment, the probe includes an ambient temperature responsive reference sensor whereby the probe is applicable over a wide range of various fluid temperature systems.

Other features and the advantages of the present invention will be apparent from the following description, reference being had to the accompanying drawings wherein preferred embodiments of the invention are illustrated.

BRIEF DESCRIPTION OF THE DRAWINGS

FIG. 3 is a sectional view taken along line 3—3 of FIG. 2, but on a larger scale;
FIG. 5 is an exploded view, the main body being shown in section as in FIG. 3.

DESCRIPTION OF THE PREFERRED EMBODIMENTS

Figure 1:
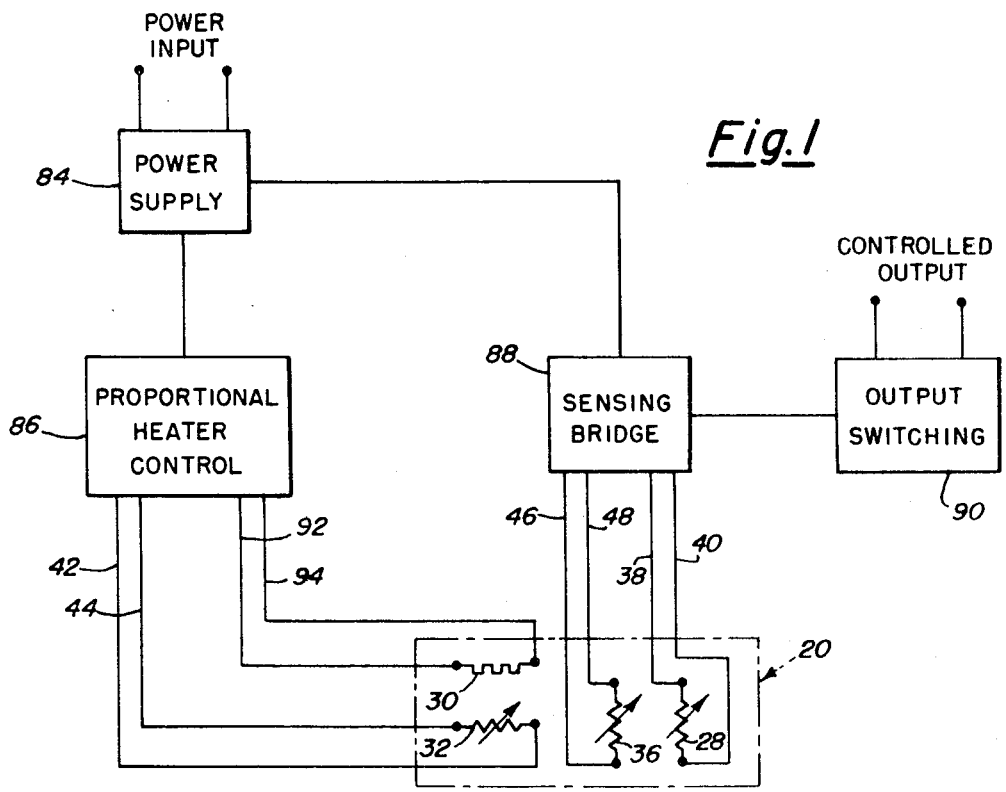
FIG. 1 is a block diagram of a system using the probe.
Figure 2:
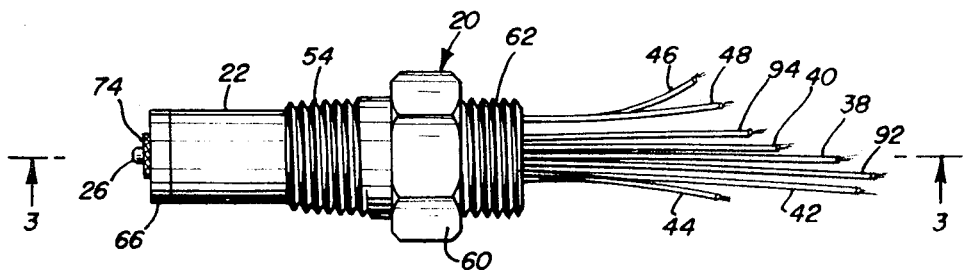
FIG. 2 is a side view of the probe used in the system shown in FIG. 1.
Figure 4:
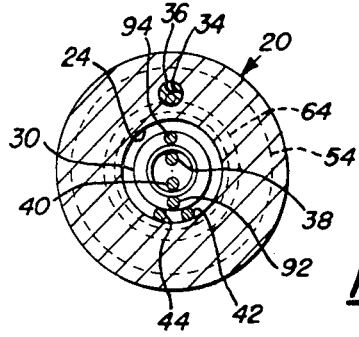
FIG. 4 is a transverse sectional view taken along line 4—4 of FIG. 3.

Referring generally to the drawings, the probe 20 includes a main body or housing 22 having an axial bore 24 for receiving a removable tube 26, which is formed of high heat conducting material such as copper or brass. Tube 26 carries a flow sensor 28 at the extreme outer end of the tube and at the extreme outer end of the housing 22. Tube 26 also carries an electric heater 30 in heat exchange relationship with the outer surface of the tube 26. A feedback sensor 32 is disposed in heat exchange relationship with and is carried by the tube 26 intermediate the flow sensor 28 and the heater 30.

The housing 22 is also bored longitudinally to provide an elongated recess 34 for receiving an ambient temperature responsive sensor 36.

Conductors for the sensor 28 are shown at 38 and 40, those for sensor 32 at 42 and 44 and those for sensor 36 at 46 and 48. These conductors extend through a silicone rubber seal 52 which is pressed into and in sealing relationship with the outer end of the bore 24 of housing 22. The seal being resilient and flexible provides sealing relationship between it and the conductors.

Referring more in detail to the drawings, the housing 22 is threaded at 54 for securing the probe to a wall 56 of a chamber 58 containing the fluid to be measured. Lands 60 are formed on the outer surface of the body for turning the probe. The housing is also threaded at 62 to assist in mounting the probe to a case or connector (not shown). The bore is enlarged at the outer end and the extreme outer end thereof is threaded as at 64 for receiving an externally threaded closure member 66.

The main body or housing 22 is formed of metal such as brass, stainless steel, etc., or may be formed of rigid plastic. The member 66 is formed of nylon or glass.

The member 66 is internally threaded as at 68. The outer end 70 of tube 26 is reduced in diameter and is externally threaded at 72 and is received by the internal threads 68 of the insulating closure member 66 to form a seal between the extreme outer ends of the housing 22 and the tube 26. The extreme outer end 70 of the tube 26 is sealed by an internally threaded retaining ring 74. This ring is threaded onto the outer end of threads 72 of the tube 26.

Each of the sensors 28, 32 and 36 may be encapsulated with a material such as epoxy 78. The electric heater 30 is in the form of a coil and encircles the tube 26. The resistance of the heater is approximately two hundred ohms. The maximum A.C. voltage applied thereto is forty and the maximum temperature is five hundred degrees Fahrenheit. A thin layer of mica 80 is interposed between the coil and the tube and a thin layer of mica 82 surrounds the coil. These layers of mica may extend over the sensor 32 to hold the same in intimate heat exchange relationship with the tube 26.

Referring now to FIG. 1, showing a block diagram of one system in which the probe 20 can be employed, the probe being diagrammatically shown, a power supply 84 supplies current to a proportional heat controller 86, a sensing bridge 88 and a current output switch or relay 90. Current for the heater 30 is by conductors 92 and 94.

When current is applied to the heater 30, through proportional heat controller 86, the heat conductor tube 26 is heated slightly above the ambient temperature of the fluid in which it is placed. When the tube 26 attains the required temperature, as set by the heat control sensor 32, the controller 86 reduces the power level to the required degree to maintain the tube 26 at the present temperature range. The semi-conductor flow sensor 28 is placed in opposite electric bridge legs with the ambient temperature reference sensor 36.

When a fluid flow commences, the outer tip of the metal heat conductor tube 26 is cooled by the passage of fluid therealong and sensor 28 changes resistance by the cooling action, which change in resistance unbalances the bridge 88. The output of the bridge is fed to the output switch 90. Too, as the moving fluid cools the tip of tube 26 and the flow sensor 28, the sensor 32 also responds to the cooling action and commences to act in conjunction with the heat controller 86 to feed more current to the heater 30. The ratio of heat removed from the outer tip of tube 26 by the fluid flow will almost equal the amount of heat being applied by the proportional heat controller 86. When the probe 20 is made to respond to different characteristics of the fluid, although with greatly different conductivity characteristics, the proportional heat controller 86 will continue to maintain the outer tip of tube 26 at the predetermined stable temperature.

From the foregoing it is apparent that by virtue of the present invention, I have provided a probe which meets all of the requirements set forth in the aforementioned Summary of the Invention.

Having described my invention, I claim:

1. A probe for indicating the flow of fluid, comprising in combination:
   (A) a sensor element of the type having the characteristic of varying in resistance with variations in temperature;
   (B) an electric heater element in heat exchange relationship with the sensor;
   C) a casing with an outer end that isolates at least one of the elements from direct contact with the fluid being probed;
   (D) a removable heat conducting tube disposed in the casing and extending to the extreme outer end thereof, said sensor element extending to the outer end of the tube and said heater element being in heat receiving relationship with the tube.

2. A probe as defined in claim 1, characterized in that the sensor element is disposed in the casing and isolated from direct contact with the fluid.

3. A probe as defined in claim 1, characterized in that the heater element is disposed in the casing and isolated from direct contact with the fluid.

4. A probe as defined in claim 1, characterized in that both elements are disposed in the casing, and isolated from direct contact with the fluid.

5. A probe as defined in claim 1, characterized in that the heater is in the form of a coil, said coil surrounding the tube.

6. A probe for indicating the flow of fluid, comprising in combination:
   (A) a sensor element of the type having the characteristic of varying in resistance with variations in temperature;
   (B) an electric heater element in heat exchange relationship with the sensor;
   (C) a casing with an outer end that isolates at least one of the elements from direct contact with the fluid being probed, said casing being formed of heat conducting material and being provided with two longitudinally extending bores;
   (D) a removable heat conducting element in one of the bores and extending to the extreme outer end of the casing, said sensor being a flow detector and extending to the outer end of the heat conducting element and in heat exchange relationship therewith, said heater being in heat exchange relationship with said element, and further characterized to include:
   (E) a reference sensor disposed in the other bore and in heat exchange relationship with the casing.

7. A probe as defined in claim 6, characterized in that the removable heat conducting element is in the form of a tube, the first mentioned sensor being disposed in the outer end of the tube.

8. A probe as defined in claim 7, characterized in that the heater is in heat exchange relationship with the tube.

9. A probe as defined in claim 7, characterized in that the heater is in the form of a coil surrounding the tube.

10. A probe as defined in claim 6, characterized to include:
    (F) a feedback signal sensor in heat exchange relationship with said heat conducting element.

11. A probe as defined in claim 10, characterized in that the removable heat conducting element is in the form of a tube, the first mentioned sensor being disposed in the outer end of the tube.

12. A probe as defined in claim 11, characterized in that the heater is in heat exchange relationship with the tube.

13. A probe as defined in claim 12, characterized to include:
    (G) conductors connected with the first mentioned sensor, said conductors extending outwardly from the end of the casing opposite the outer end thereof.

14. A probe for indicating the flow of fluid, said probe comprising in combination:
    (A) a sensor of the type having the characteristic of varying in resistance with variations in temperature;
    (B) an electric heater in heat exchange relationship with the sensor;
    (C) a feedback sensor in heat exchange relationship with the electric heater element;
    (D) an ambient temperature reference sensor;
    (E) a casing isolating the heater and the feedback sensor from direct contact with the fluid being sensed;
    (F) a proportional heat controller for the heater;
    (G) a circuit connecting the heat controller to a source of current;
    (H) a circuit connecting the heater with the heat controller;
    (I) a circuit connecting the feedback sensor with the heat controller;
    (J) a sensing bridge;
    (K) a circuit connecting the first mentioned sensor to a leg of the bridge;
    (L) a circuit connecting the ambient temperature reference sensor to the opposite leg of the bridge.

15. A probe as defined in claim 14, characterized in that the ambient temperature reference sensor is disposed in the casing.

16. A probe for indicating the flow of fluid, comprising in combination:
   (A) an elongated heat-conducting casing having a longitudinally extending bore;
   (B) a sensor of the type having the characteristic of varying in resistance with variations in temperature, said sensor being disposed in said bore and having an end extending through the casing;
   (C) an electric heater in said bore and in heat-exchange relationship with the sensor;
   (D) a feedback sensor disposed in said bore in intimate heat-exchange relationship with the electric heater;
   (E) an ambient temperature reference sensor, said latter sensor being in intimate heat-exchange relationship with the casing; and
   (F) means responsive to said feedback sensor for controlling the electric heater.

17. A probe as defined in claim 16, characterized in that the casing has a second bore and that the ambient temperature reference sensor is disposed in the second mentioned bore.

References Cited

UNITED STATES PATENTS

| 2,728,225 | 12/1955 | Skibitzke | 73—204 |
| 3,199,348 | 8/1965 | Salera | 73—204 |

FOREIGN PATENTS

| 177,936 | 3/1954 | Austria | 73—204 |
| 1,410,911 | 8/1965 | France | 73—204 |

OTHER REFERENCES

German printed app. No. 1,127,608, April 1962.

CHARLES A. RUEHL, Primary Examiner